(12) United States Patent
Popovic et al.

(10) Patent No.: US 6,768,723 B1
(45) Date of Patent: Jul. 27, 2004

(54) METHOD OF OPERATING A FULL DUPLEX SPEAKERPHONE ECHO CANCELLER

(75) Inventors: Mirjana Popovic, Ottawa (CA); Rob McLeod, Nepean (CA)

(73) Assignee: Zarlink Semiconductor Inc., Kanata (CA)

( * ) Notice: Subject to any disclaimer, the term of this patent is extended or adjusted under 35 U.S.C. 154(b) by 0 days.

(21) Appl. No.: 09/453,147

(22) Filed: Dec. 2, 1999

(30) Foreign Application Priority Data

Dec. 2, 1998 (GB) .............................................. 9826501

(51) Int. Cl.[7] .................................................. H04B 3/20
(52) U.S. Cl. ...................................... 370/287; 370/286
(58) Field of Search ................................ 370/286, 287, 370/276

(56) References Cited

U.S. PATENT DOCUMENTS 5,631,900 A * 5/1997 McCaslin et al. ........... 370/287
6,434,110 B1 * 8/2002 Hemkumar .................. 370/201

FOREIGN PATENT DOCUMENTS

| CA | 1234235 | 3/1988 |
|---|---|---|
| GB | 2 295 300 | 5/1996 |
| WO | WO 96/14694 | 5/1996 |

* cited by examiner

*Primary Examiner*—Wellington Chin
*Assistant Examiner*—Raj Jain
(74) *Attorney, Agent, or Firm*—Keating & Bennett, LLP

(57) ABSTRACT

A method of improving convergence of an echo canceller in a full duplex speakerphone, wherein the echo canceller includes LEC (Line Echo Canceller) and AEC (Acoustic Echo Canceller) portions, comprising the steps of capturing LEC coefficients during operation, storing the coefficients, and utilizing the stored coefficients as default values during start-up of a subsequent call. The method of the present invention reduces the overall convergence time of the echo canceller by alleviating the requirement to wait for a suitable reference signal in order to converge the LEC.

5 Claims, 2 Drawing Sheets

METHOD OF OPERATING A FULL DUPLEX SPEAKERPHONE ECHO CANCELLER

FIELD OF THE INVENTION

The present invention relates in general to speakerphones and more particularly to an improved method of operating an echo canceller in a full duplex speakerphone connected to an analog line, where the near end hybrid characteristic is the same for each connection.

BACKGROUND OF THE INVENTION

One of the most important performance indicators for full duplex speakerphones is convergence time (i.e. the time required by the echo cancellers within the speakerphone to reach an acceptable level of cancellation). The convergence time of the speakerphone depends both on internal Line Echo Canceller (LEC) and Acoustic Echo Canceller (AEC) convergence times. In order to converge quickly and properly, a speakerphone echo canceller requires a reference signal with correct stochastic properties. At the beginning of a call (Start-up), the reference signal is usually not sufficiently stochastic (e.g. the line signal typically comprises narrow band tones such as dial tone) or speech is not present, so that echo cancellation is unable to commence immediately. In such situations the speakerphone loop may remain unstable for a noticeable period of time. This can result in feedback or "howling" of the speakerphone during start-up, especially when the speaker volume is high.

In order to prevent such feedback, it is an objective of speakerphone design to ensure that the echo cancellers (LEC and AEC) converge rapidly to the correct echo path models at start-up. Otherwise, the speaker volumes must be reduced during startup, which may be annoying to a user.

Since the LEC usually models an echo path that is reasonable constant, and the AEC often has to track frequent changes in the echo path, it is advantageous if the LEC filter adapts quickly to the correct model and remains stable while the AEC undergoes convergence.

According to one prior art approach to reducing the problem of feedback during speakerphone start-up, howling detection has been used (see ITU-T Recommendation G.168) in combination with gain control. According to this approach, the speaker volume (or loop gain) is reduced when howling is detected. A drawback of this approach is that the gain switching is often audible which may be annoying to the user.

Another prior art solution involves operating the speakerphone in a half duplex mode on start-up in order to prevent howling and echo from interfering with communication. The speakerphone remains in the half-duplex mode until the LEC adapts sufficiently to ensure echo cancellation. A drawback of this approach is that the speakerphone sometimes stays in the half-duplex mode for a long time, making communication between telephone parties difficult or impossible. Yet another prior art solution involves forcing the speakerphone to start operation at a predetermined "acceptable" low volume level which guarantees stability in the audio loop, and then gradually increasing the volume as convergence of the echo canceller is achieved. A drawback of this approach is that the volume adjustment is often noticeable to the user.

SUMMARY OF THE INVENTION

According to the present invention, a method is provided for improving the start-up convergence time of the LEC filter, thereby resulting in a total reduced convergence time for the speakerphone. This method is based on capturing the LEC coefficients once the LEC has converged, and saving them as the default coefficients for the next call. As a result, the echo canceling algorithm does not have to wait for a suitable reference signal to commence convergence. At start-up, the echo canceller immediately begins canceling the line echo, based on the previously stored LEC coefficients, thereby assisting the AEC algorithm by eliminating residual line echo from the acoustic signal which the AEC algorithm is required to converge to, and initially making the speakerphone loop more stable.

BRIEF DESCRIPTION OF THE DRAWINGS

A detailed description of the prior art and of a preferred embodiment of the invention is provided herein below with reference to the following drawings, in which.

DETAILED DESCRIPTION OF PRIOR ART AND PREFERRED EMBODIMENT

As discussed briefly above, a speakerphone echo canceller comprises two adaptive filters which attempt to converge to two different echo models (acoustic and network echo) at the same time. As a result, speakerphones can easily become unstable, especially during start-up.

Figure 1:
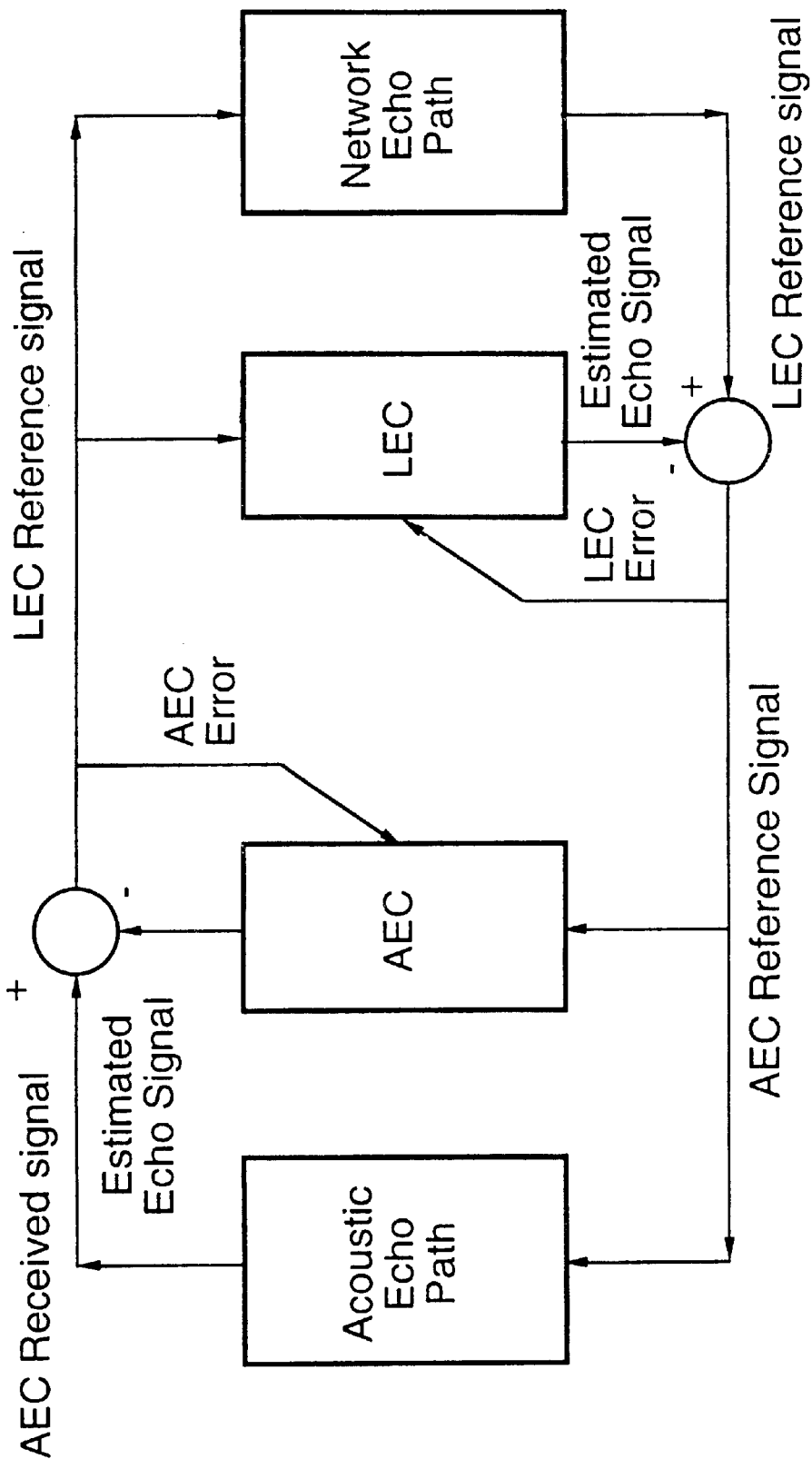
FIG. 1 is a block diagram of a prior art speakerphone echo canceller structure.

A traditional speakerphone echo canceller is shown in FIG. 1, wherein essential speakerphone components which are not related to echo cancellation have been omitted for clarity (e.g. double talk detector, non-linear processor, etc.) and are not addressed herein since they are not germane to the invention. The echo canceller attempts to model the transfer function of the echo path by means of an LEC filter and an AEC filter. The received signal (line or acoustic) is applied to the input of each filter (LEC and AEC) and to the associated echo path (network or acoustic) such that the estimated echo can be canceled by simply subtracting the signal which passes through each echo canceller from the received signal. If the transfer function of the model of the echo path is exactly the same as the transfer function of the echo path, the echo signal component is completely canceled (i.e. the error signal will be zero). The error signal is used for adaptation, so that the echo canceller converges to the correct transfer function, as discussed briefly above.

Typically, an algorithm such as the NLMS (Normalized-Least-Mean-Squared) algorithm is used to approximate the echo path (see "C261 (UNIC) DSP Re-engineering and Performance Report" Mitel Semiconductor, Document No. C261AP13, Oct. 21, 1996).

From FIG. 1 it will be appreciated that the residual echo after imperfect cancellation by the LEC will pass to the AEC reference signal. Since this residual echo is not correlated to the AEC received signal, this can cause the AEC filter to diverge. The extent to which AEC filter diverges depends on the level of the residual line echo. If the line echo is sufficiently canceled, its effect on the AEC behavior will be negligible.

Echo Return Loss Enhancement (ERLE) is an indicator of the amount of echo removed by an echo canceller. The ERLE is defined as:

$$ERLE(dB) = 10\log_{10}[Power(ReceivedSignal)/Power(ErrorSignal)];$$

A generally acceptable LEC convergence time requires that the echo canceller achieve 27 dB of ERLE in 0.5 sec (in ideal conditions).

Since the telephone is always connected to the same local loop (i.e. to the near-end Central Office (CO) or PBX), the impedance of the local loop remains the same for each call and consequently the near-end echoes remain fairly constant, from call to call. Accordingly, according to the present invention the local loop echo coefficients can be stored and re-used from call to call, thereby improving the start-up ERLE of the LEC.

Figure 2:
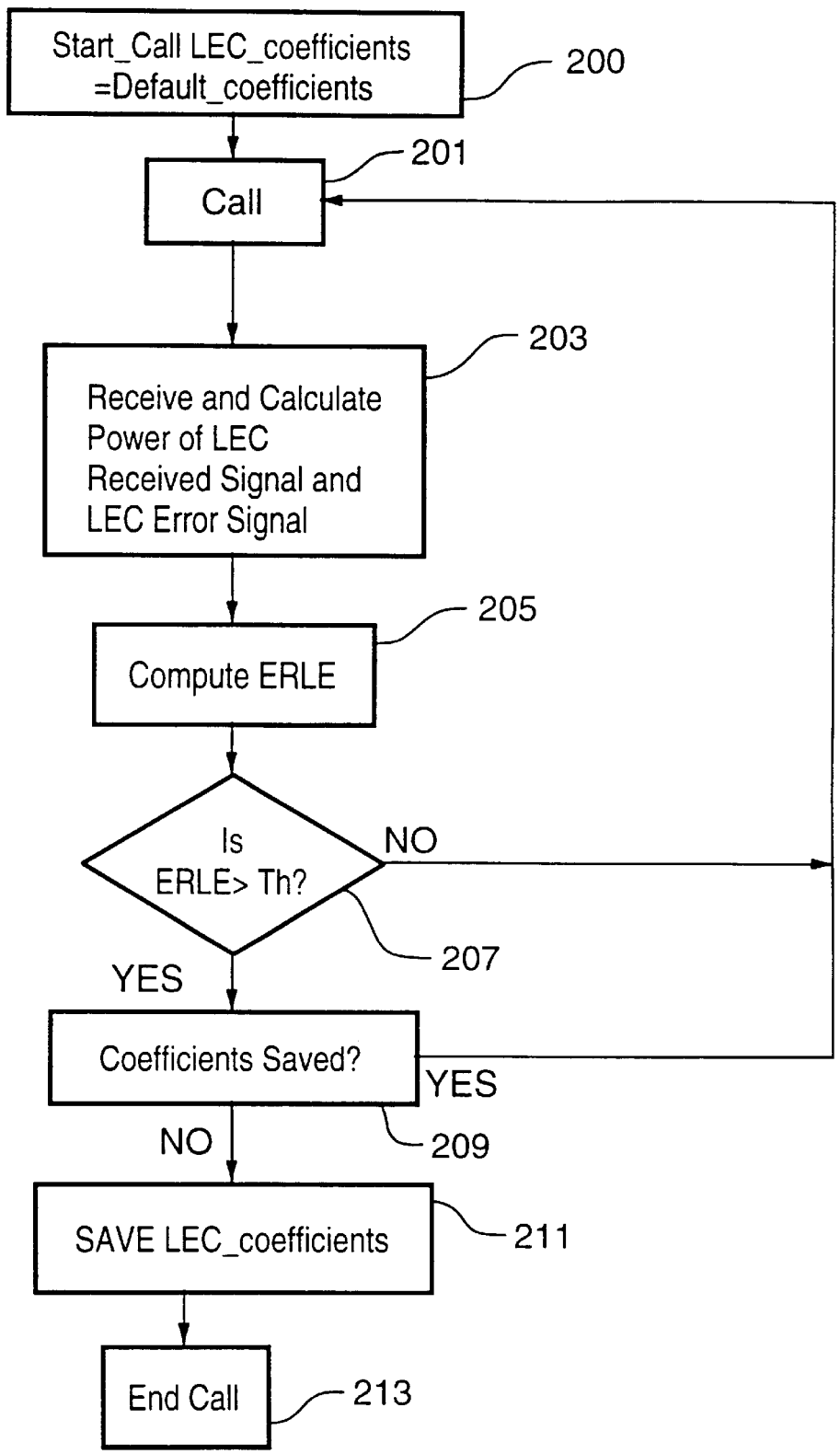
FIG. 2 is a flow chart showing the steps of the echo cancellation method according to the present invention.

Thus, with reference to the flowchart of FIG. 2, after start-up of the echo canceller (Step 200), any previously stored default LEC coefficients are loaded into the LEC and the LEC begins convergence using the well known NLMS algorithm (or other). On initial power-up of the speakerphone (i.e. prior to placing the first call), the initial coefficients are zero. Thus, the first call after power-up will always be a "training" call that results in capturing a suitable set of default coefficients for future calls. Next, the algorithm according to the present invention is executed (referred to herein as Call—step 201). The signal levels of the LEC received signal and error signal are detected (step 203) and the ERLE is calculated using the formula set forth above (step 205). When a predetermined ERLE threshold level (Th) is reached (e.g. at least 24 dB of echo is canceled), as calculated at step 207, and provided that the best LEC coefficients have not been previously saved during the call-in-progress (step 209), then the LEC coefficients of the near echo are saved (step 211). Convergence of the AEC then proceeds as per usual and the call is completed (step 213). Once saved, the default coefficients are not be recalculated again for the duration of the call (i.e. a YES decision at step 209). However, the LEC default coefficients will be calculated once per each call to ensure the best default set is captured for the next call.

At start-up of the next call, the previously stored LEC coefficients are retrieved and used as the default coefficient set for the LEC (step 200), instead of starting from zero.

The following pseudo code illustrates the principles of the inventive method in greater detail:

Power-up: Default_coefficients=[000...0];
Start_Call: LEC_coefficients=Default_coefficients;
  Call:
    Execute LEC algorithm;
      Calculate power level of received signal
      Calculate power level of error signal;
      If (ERLE>Threshold) AND (Best default set not saved)
        Save near echo coefficients
      If Not(End of the Call) Go to Call:
      If New Call Go to Start_Call;

Thus, according to the algorithm or method of the present invention, each call subsequent to the initial power-up "training" call with default coefficients that model the network echo path and guarantee small LEC error. This improves the training and tracking characteristic of the AEC and eliminates the feedback during start-up. The best results will be achieved when the training call uses a handset since there is no AEC-LEC loop instability and the LEC can therefore converge quickly.

Other embodiments and applications of the invention are possible. For example, this algorithm with some variations may also be implemented for the AEC filter to capture the acoustic feedback through the plastic, which will be constant for the specific phone design. Although a threshold ERLE value of 24 dB is disclosed herein, the threshold value may be varied to provide optimum performance for any particular application. All such variations and modifications are believed to be within the sphere and scope of the invention as set forth in the claims appended hereto.

We claim:

1. A method of operating a full duplex speakerphone having a line echo canceller which receives a reference signal and converges to an estimated echo signal of a received line signal via feedback of an error signal, said echo canceller being characterized by predetermined filter coefficients when converged, said method comprising the steps of:
    a) detecting power levels of said received line signal and said error signal during a call in progress;
    b) calculating an Echo Return Loss Enhancement value based on said power levels of said received line signal and said error signal; and
    c) in the event said Echo Return Loss Enhancement value exceeds a predetermined amount then storing said predetermined filter coefficients and applying said predetermined filter coefficients to said echo canceller during calls subsequent to said call in progress; and
    d) in the event said Echo Return Loss Enhancement value does not exceed said predetermined amount then reexecuting steps a) to c).

2. The method of claim 1, wherein said Echo Return Loss Enhancement value is expressed in decibels as ERLE(dB)= $10\log_{10}[\text{Power}(\text{ReceivedSignal})/\text{Power}(\text{ErrorSignal})]$.

3. The method of claim 2, wherein said predetermined amount is at least 24 dB.

4. The method of claim 2, wherein said predetermined amount is at least 27 dB.

5. The method of claim 1, wherein the stored predetermined filter coefficients represent only a constant part of the echo signal.

* * * * *